D. APPEL.
VALVE GEAR FOR INTERNAL COMBUSTION ENGINES.
APPLICATION FILED MAY 31, 1912.
1,057,399.
Patented Apr. 1, 1913.
4 SHEETS—SHEET 1.
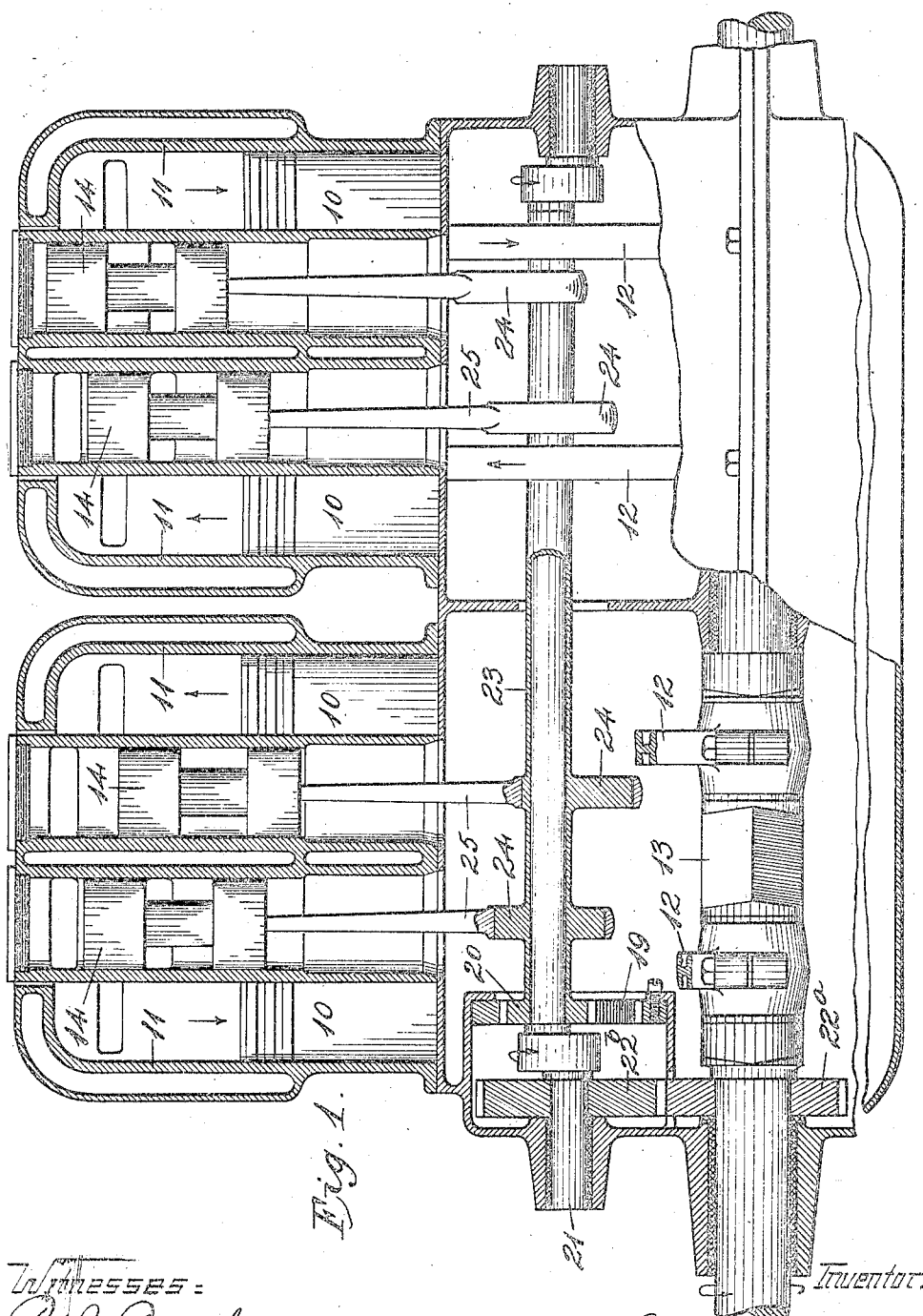

D. APPEL.
VALVE GEAR FOR INTERNAL COMBUSTION ENGINES.
APPLICATION FILED MAY 31, 1912.
1,057,399.
Patented Apr. 1, 1913.
4 SHEETS—SHEET 2.
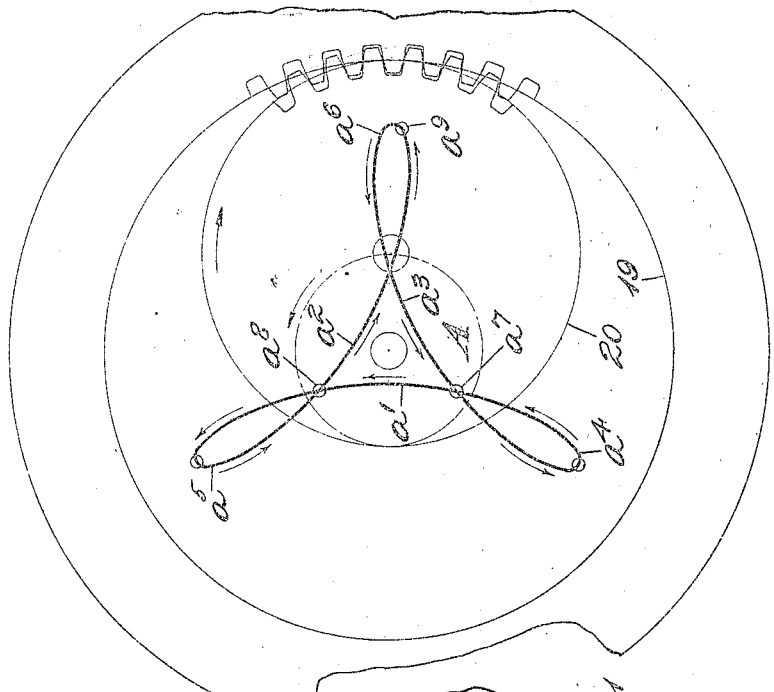
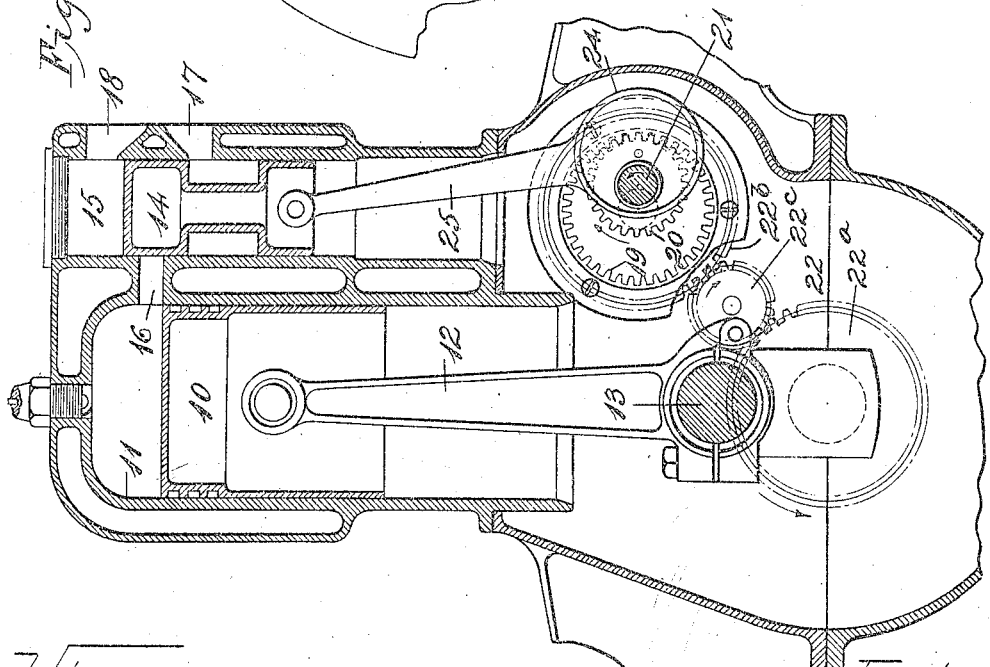

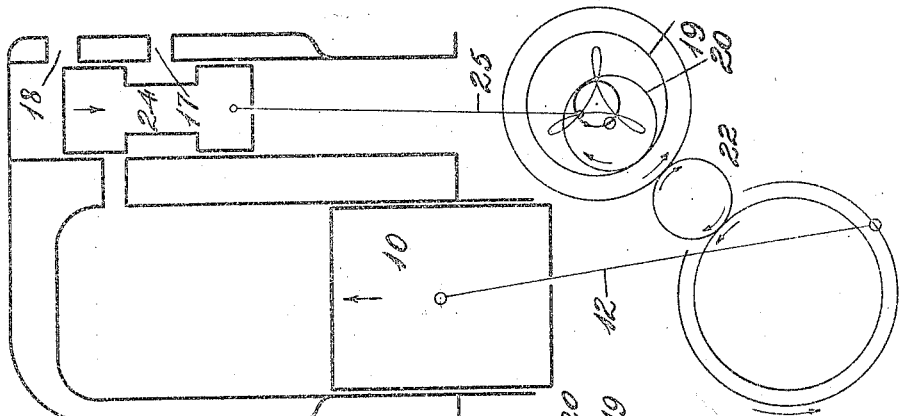
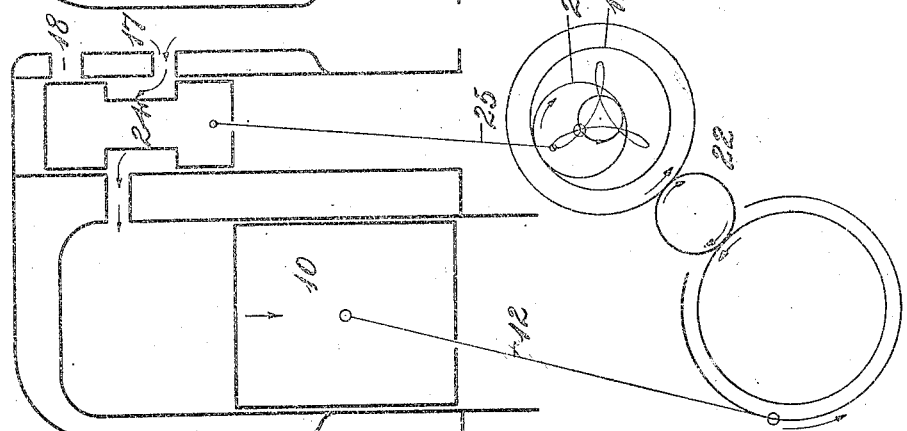
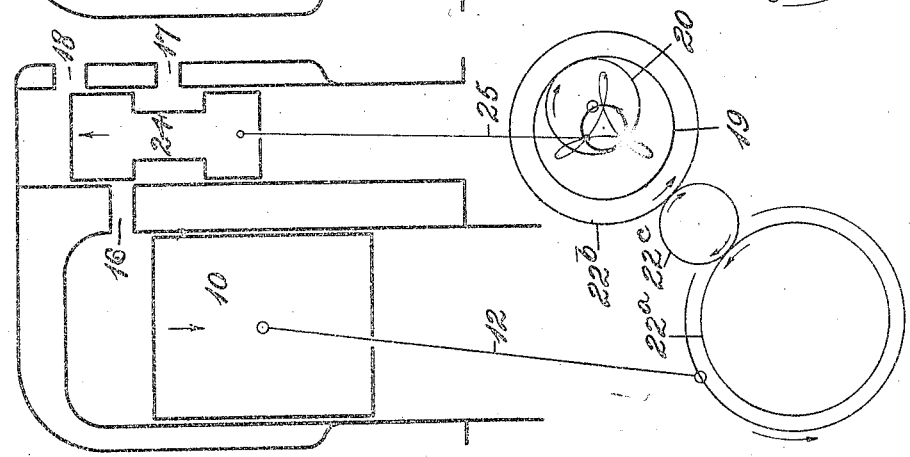

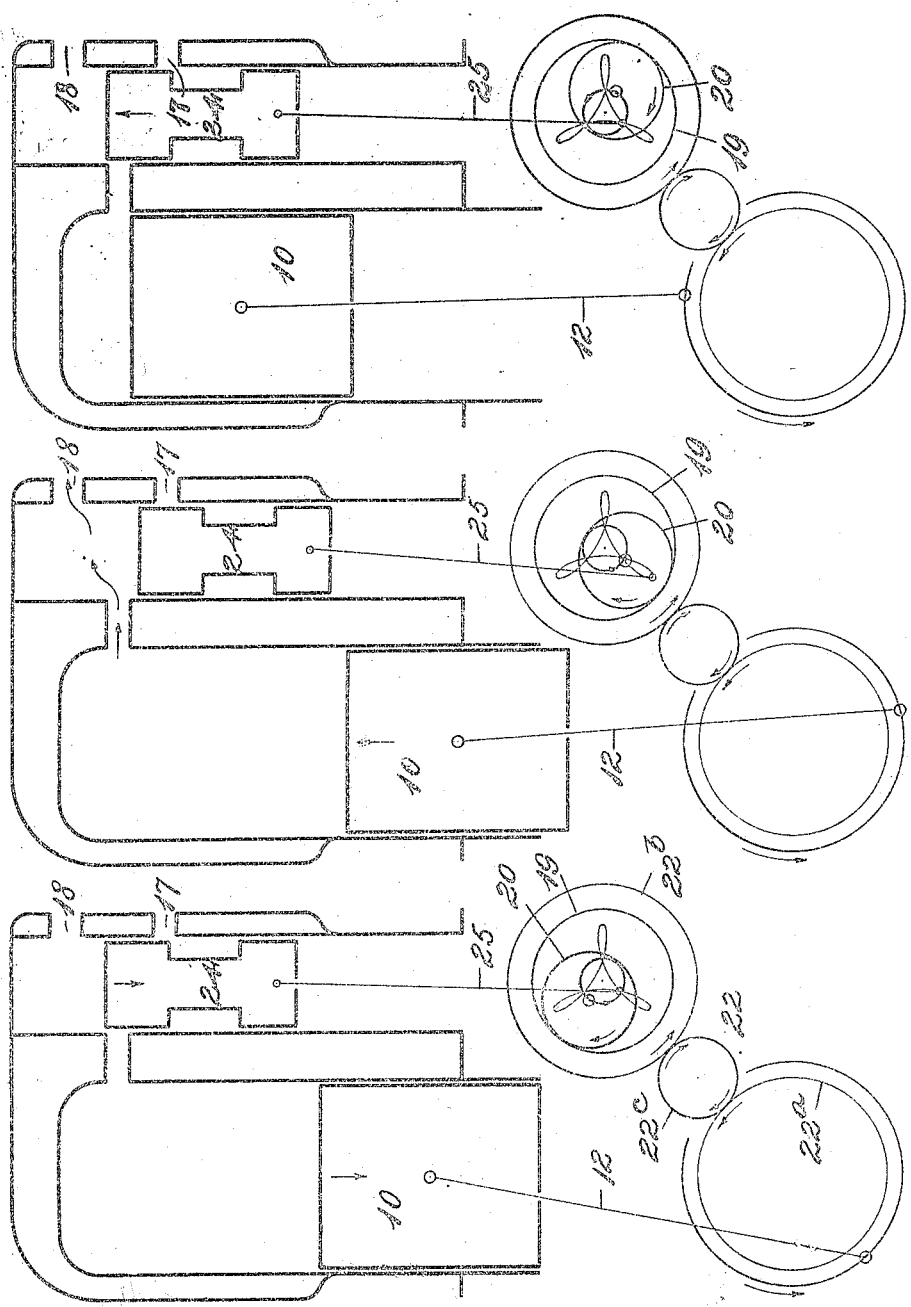

UNITED STATES PATENT OFFICE.

DANIEL APPEL, OF EAST CLEVELAND, OHIO.

VALVE-GEAR FOR INTERNAL-COMBUSTION ENGINES.

1,057,399.

Specification of Letters Patent.    Patented Apr. 1, 1913.

Continuation of application Serial No. 571,472, filed July 11, 1910. This application filed May 31, 1912. Serial No. 700,555.

*To all whom it may concern:*

Be it known that I, DANIEL APPEL, a citizen of the United States, residing at East Cleveland, in the county of Cuyahoga and State of Ohio, have invented a certain new and useful Improvement in Valve-Gear for Internal-Combustion Engines, of which the following is a full, clear, and exact description.

This invention relates to improvements in valve gears or valve operating mechanisms adapted particularly for internal combustion engines, and has for its chief objects the provision of a valve gear which results in higher efficiency, fewer parts in the valve and valve operating mechanism, and less weight per horse power than with the valve gears in use at the present time.

Further, and more specifically, the invention aims to provide a valve gear which moves positively in both directions, a valve controlling both the inlet and exhaust ports, and causes said valve to function in a manner such as to produce rapid opening and closing of the inlet and exhaust ports, and to secure large volumetric capacity of said ports by so operating the valve as to cause a considerable time period to elapse with inlet and exhaust ports full open before the valve starts to close the ports; which is simple in construction and operation, silent in action, inexpensive to construct and has great durability.

In the attainment of the above objects, I provide a valve gear having an operative connection with the valve or valve rod, the point or axis of which connection has a certain definite path of movement during the cycle of engine operation, such that during the latter part of the exhaust stroke of the piston, and the early part of the suction stroke, the axis of connection between the valve gear and adjacent end of the valve rod sweeps through a path, the terminals of which are nearly in line with the path of linear or substantially linear movement traversed by the opposite end of the rod, and in this case is substantially vertical (assuming that the engine is of the vertical type), giving the valve a rapid stroke upward from one extreme position to the other, or from a position with the exhaust port full open to a position with the intake port full open. Thence after the intake port is full open for an appreciable period, the valve connection travels first downwardly and thence laterally during the period corresponding to the latter part of the suction stroke and greater part of the compression stroke, the downward movement giving the valve a rapid downward stroke which closes the inlet port and brings the valve to its mid-position, or substantially mid-position, with both ports closed, and the lateral movement which thence takes place, causing no material valve movement. Thence the valve connection again swings laterally in the reverse direction, during which the piston travels through the greater part of the working or firing stroke, which lateral movement is converted to an approximately vertical movement, during the latter part of the working stroke, giving the valve a further rapid downward stroke to the position first referred to or to its lowermost position with the exhaust port full open. In carrying out my invention, I employ a valve gear which gives to the said connection between the gear and valve rod, a movement such that during the complete cycle of engine operation, the said connection describes an approximately triangular figure, which is preferably a three-lobed hypocycloidal figure, having three curved sides, and having loops at the apices or corners of the figure.

The mechanism which I prefer to employ so as to impart to the axis of the valve connection the above described movement, is in the form of a hypocycloidal gear, the parts of which are so proportioned and the planetary gear of which is driven at the proper speed relative to the crank shaft, as to obtain the closed three-lobed hypocyclic path of movement, and the figure thus described occupying such a position with reference to the axis of the valve that the desired functioning of the valve is obtained.

As my invention resides solely in the valve gear or valve operating mechanism, the form and construction of those parts of the engine, except the valve gear itself, is quite immaterial to the invention, and while I prefer to employ in connection with my improved valve gear a single valve for each cylinder, which valve is preferably of the reciprocating type and controls both the inlet and exhaust ports, the particular form of valve is also immaterial. For the sake of simplicity, I have illustrated my invention in connection with a piston valve, although it is to be understood that any other form of reciprocating valve could be employed equally well. The invention is applicable also to an engine with any number of cylinders.

In the drawings, I have shown my invention in one of its simplest forms, and applied to a four cylinder four-cycle engine, largely illustrated in a conventional manner, and in the drawings Figure 1 is a longitudinal vertical sectional view with all pistons in substantially mid position, the section being taken partly in one vertical plane through the axis of the cylinders and partly in a vertical plane through the axis of the valves or to the rear of the plane through the cylinders. Fig. 2 is a transverse sectional view with the power shaft turned 90 degrees from the position shown in Fig. 1, and showing the positions of a piston and its associated valve, and the positions of the various parts of the valve gear at the beginning of the working stroke. Fig. 3 shows conventionally the two gears of the hypocycloidal valve gear or valve operating mechanism, and the path of movement described by the axis of connection between the valve gear and valve during a complete cycle of engine operation. Figs. 4 to 9 are diagrammatic views showing the positions of the piston, valve and valve gear at different points of the cycle of engine operation.

Referring now to the drawings, it will be seen that the engine is provided with pistons 10 which operate in jacketed cylinders 11, and are connected by the usual connecting rods 12 to a power shaft 13,—the cranks of which are in Fig. 1, shown in substantially horizontal position. The piston 1 (counting from the left) is at the middle of its downward working stroke, the piston 2 is at the middle of its upward exhaust stroke, the piston 3 is at the middle of its upward compression stroke, and piston 4 is at the middle of its downward suction stroke.

The admission of gases to and the exhaust of gases from each cylinder is controlled by a reciprocating valve 14, here shown of the piston type, mounted for reciprocating movement within a valve cylinder 15. The several valves 14 and valve cylinders 15, as viewed from the position of this figure, are in reality at the rear of the cylinders 11 and pistons 10. Hence to clearly show the valves, only parts of the cylinders and piston are here shown. Between each main cylinder 11 and the associated valve cylinder 15 is a passageway 16 which is common to both the inlet and exhaust gases. Each valve cylinder is provided with an inlet port 17, and an exhaust port 18, so arranged with reference to the valve 14 and with reference to the passageway 16, that when the valve is in its mid position, as shown in Fig. 2, the passageway 16 is closed with reference to the inlet and exhaust ports, and when the valve is raised a suitable distance from the position shown in Fig. 2, the inlet port is placed in communication with the passageway 16 and with the cylinder, and when it is lowered a suitable distance from the position shown in Fig. 2, the exhaust port is placed in communication with the passageway 16 and the cylinder.

The valves are operated by my improved valve gear or valve operating mechanism which may be defined as a hypocycloidal valve gear and which includes an internal gear 19, preferably normally fixed in position and a planetary pinion 20, eccentrically supported with reference to the internal gear 19, by a member which rotates the planetary pinion about the axis of the internal gear 19. In this instance, the planetary pinion is eccentrically mounted upon a valve crank shaft 21, which is geared to the power shaft or main crank shaft 13, and is preferably driven at power shaft speed by a one-to-one gearing 22, including a gear 22$^a$ on the power shaft, a gear 22$^b$ of the same size as the gear 22$^a$ and mounted upon the valve crank shaft 21, and an idler gear 22$^c$ suitably supported between these two gears and in mesh therewith. While it is desirable that the pinion be revolved about the axis of the internal gear at power shaft speed, it is not necessary that it be carried by a separate crank shaft driven from the power shaft, but the present arrangement is simple and satisfactory to illustrate the principle of my invention. This planetary pinion 20 has a pitch diameter which is two-thirds the pitch diameter of the internal gear 19.

By reference particularly to Fig. 1, it will be seen that the planetary pinion 20 is connected to a rather long sleeve 23, which is mounted upon and extends along the offset portion of the valve crank shaft 21, and that mounted upon this sleeve so as to rotate therewith are four eccentrics 24, each connected by a valve rod 25 to one of the valves. The eccentricity of each of the eccentrics 24 with reference to the sleeve 23 is less than the pitch radius of the planetary pinion, and I prefer, for reasons to be explained presently, that the difference between the eccentricity of the eccentric and the pitch radius of the planetary pinion, be approximately one-sixth the pitch diameter of the pinion. Therefore, the axis of the connection between each eccentric and the valve rod 25, the said axis of connection being in this case the center of the eccentric, is displaced with reference to and is within the pitch circle of the pinion. If the engine were provided with but a single cylinder, and a single valve, the valve rod 25 might well be connected directly to the pinion 20, or to a crank rotating with said pinion, in which event, the point of connection between the valve rod and crank, or the axis of connection, would, as is the case with the eccentric, be displaced with reference to the pitch line of the pinion, to the extent before stated. Inasmuch as the pinion is free to rotate about its own axis, it has two movements, one a revolving movement about the axis of the internal gear 19, and the other a rotation about its own axis, and as the pinion is driven at power shaft speed, and has a pitch diameter equal to two-thirds the pitch diameter of the internal gear, during the complete cycle of engine operation, or during two revolutions of the power shaft, the pinion makes two complete revolutions in one direction about the axis of the internal gear, and also makes one complete rotation about its own axis backward or in the reverse direction. Consequently, any point on the pitch line of the planetary gear, during the two revolutions of the power shaft, would describe three complete hypocycloidal curves, or would describe a complete or closed triangular figure having three curved sides composed of three complete hypocycloidal curves, with acute angles at the apices of the triangle. Of course any point on an eccentric in line with the pitch line of the planetary gear would likewise describe such a figure. However, the movement of the axis of connection between an eccentric and its valve rod (as said axis of connection is displaced inwardly with reference to the pitch line of the planetary pinion) describes during a complete cycle of engine operation, a closed triangular figure composed of three equal hypocycloidal curves having loops at the apices of the triangle. This figure which is clearly illustrated in Fig. 3, may be described as a three-lobed hypocycloidal figure, and the movement which is given to the said axis of connection may be termed a three-lobed hypocycloidal movement.

My invention in its broad aspect resides in mechanism for generating or imparting to said valve connection the path of movement just described, for, because of the fact that the said valve connection traverses this peculiarly shaped path during the cycle of engine operation, the valve is caused to function in a desirable and very economical and efficient manner.

Reference is now had to Fig. 3, wherein I have shown the two coöperating gears of the hypocycloidal valve operating mechanism, and have illustrated the path of movement, designated A described by the axis of connection between one of the eccentrics, and its associated valve rod. It will be seen that the figure representing this path of movement is composed of three hypocycloidal curves $a^1$, $a^2$ and $a^3$, and has at the apices of the figure three loops or lobes $a^4$, $a^5$, $a^6$. The parts are initially so adjusted that the side $a^1$ of the figure is disposed substantially vertically, and the ends of the loops $a^4$ $a^5$ are in a line approximately parallel to the axis of the valve. The side $a^2$ (beginning at the top of the loop $a^5$) first has a decided downward trend, and then a lateral trend, and the side $a^3$ (beginning with the end of loop $a^6$) has first a lateral trend, and then sweeps downwardly to the end of the loop $a^4$. In consequence, the two loops $a^4$ $a^5$ are nearly vertical in position, and the loop $a^6$ is nearly horizontal and is substantially midway between the ends of the loops $a^5$ and $a^4$, that is, it is displaced vertically one-half the vertical distance between the ends of the loops $a^4$ and $a^5$.

In describing the valve phases or movements in connection with this figure, let it be assumed that the valve is at its lowermost position with the exhaust port full open—that is to say with the passageway 16 full open to the port 18. The said axis of connection between the valve gear and valve rod is now at the bottom of loop $a^4$. The valve connection now traverses upwardly from its lowermost position to its uppermost position describing that part of the figure represented by the hypocycloidal curve $a^1$, and giving the valve a rapid full upward stroke from its lowermost position to its uppermost position, or from a position with the exhaust port full open to a position with the intake port full open. When the connection reaches approximately the position indicated by the letter $a^7$, the exhaust port closes, and when it reaches the position marked $a^8$, the inlet port begins to open, or stated otherwise, the valve begins to open the passageway 16 and to place the same in communication with the inlet port 17, the positions of the piston, valve and the valve gear when the valve connection reaches the point $a^8$, being shown in Fig. 4. When the connection reaches the end of the loop $a^5$, the inlet port is full open, or the passageway 16 is completely uncovered, the parts then being in the positions shown in Fig. 5. While the connection is traversing along the curved line or side $a^1$ of the figure, and the valve is given its rapid full stroke upwardly from its lowermost position to its uppermost position, the piston is traversing through the latter part of the exhaust stroke and through the first part of the suction stroke.

As the connection travels around the end of the loop $a^5$, the inlet port remains full open for an appreciable period, and thence during the period corresponding to the latter part of the suction stroke of the piston, and the major portion of the compression stroke, the valve connection sweeps first downwardly and thence laterally along the line or side $a^2$ of the figure. This movement of the valve connection imparts to the valve a quick half stroke downward to substantially its mid-position, causing the closure of the inlet port when the connection reaches substantially the position marked $a^8$. The positions of the parts when the connection reaches this point are shown in Fig. 6. The movement of the connection along the latter part of this curved line or during its substantial horizontal movement imparts very little or practically no movement to the valve, this being during the compression stroke. When the valve connection reaches the position marked $a^9$, near the end of the loop $a^6$, ignition takes place, the piston, valve and valve gear being then in the positions shown in Fig. 2.

After the connection rounds the end of the loop $a^6$, it traverses the side or curve $a^3$ of the figure during the period corresponding to the major portion of the working stroke, and the first part of the exhaust stroke. It will be seen that when the connection traverses this part of the figure, first the general trend of the movement is laterally inward, this taking place during the major portion of the working stroke, and imparting very little movement to the valve, and thence the lateral movement gradually merges into a decided downward movement into the loop $a^4$. When the connection reaches substantially the position $a^7$, the valve begins to uncover the passageway 16, and exhaust begins to take place, the piston, valve and valve gear being then in the positions shown in Fig. 7. From this point, the connection swings downward rapidly to the end of loop $a^4$ and imparts a very rapid further half stroke downward to the valve, causing the full opening of the passageway or port 16 to the exhaust of gases, the positions of the parts when the exhaust port is full open being shown in Fig. 8.

The connection has now passed through its complete path of movement, which has taken place during one complete cycle of engine operation. As the connection rounds the end of loop $a^4$, the exhaust port remains full open for an appreciable period, as was the case with the inlet port when the connection rounded the loop $a^5$, and thence the connection again sweeps upwardly along the line $a^1$, as previously described. As the connection reaches the point $a^7$, the passageway 16 is again shut off from the exhaust port 18, the parts then occupying the positions shown in Fig. 9. It will be seen therefore that as the connection sweeps upwardly along the side $a^1$ of the figure, the valve is given a quick upward stroke from its lowermost position to its uppermost position; thence the inlet port remains full open for an appreciable period; thence the port is quickly closed by causing the valve to be given a half stroke downward, or to its substantial mid-position; thence during the major portion of the compression stroke, and during the major portion of the working stroke, the valve is substantially stationary; and thence is again given a rapid half stroke downward to its lowermost position, causing the quick opening of the exhaust port. After the exhaust port remains open for an appreciable period, it is quickly closed when the valve again starts on its upward movement.

It will be noted that when the valve reaches its mid position, during its upward stroke, it is moving at substantially its maximum speed, whereas when it reaches its mid position on its downward stroke, it is substantially stationary, or at its minimum speed. The hypocycloidal valve gear therefore is a variable movement imparting mechanism, which gives to the valve the movements necessary to produce high efficiency. The advantages of the loops at the corners of the figure are first large volumetric capacity for both the inlet and exhaust ports, due to the time periods which elapse while the ports are full open, for as the connection rounds the loops, the valve is substantially stationary, and in fact during the period which elapses from the time that the valve starts to open a port until it again closes the port, the port is full open approximately half the period; and second, rapid opening and closing of the ports, the opening and closing taking place while the crank shaft is swinging through a smaller arc than is the case with any other valve operating mechanisms of which I am aware.

I have described the path of movement of the axis of the valve connection between one of the eccentrics and one of the valve rods and have described in detail the movements which are imparted to the associated valve. It will be understood, however, that the movements of the axis of the valve connection between all the eccentrics and the valve rods connected to them are similar to that above described. With the cranks of the power shaft all lying in the same plane, but part displaced 180 degrees from the others, the paths described by two of the valve connections will be exactly as shown in Fig. 3, and the paths described by the other two will be simply turned 180 degrees from that shown in Fig. 3.

I prefer that the eccentricity of the eccentrics be less than the pitch radius of the planetary pinion, and that the distance of the axis of the connection between the valve gear and the valve be displaced from the pitch line of the pinion an amount approximately equal to one-sixth the pitch diameter of the pinion, for the reason that with the axis of the connection so located with reference to the pitch line of the pinion, the loops of the figure described by the axis of valve connection are substantially one-third the length of one of the sides of the figure. In other words, the intersections of the curves at the inner ends of the loops divide each of the sides of the figure into substantially three equal parts. This I find gives the most satisfactory results and highest efficiency.

The two to three ratio of pitch diameters of the planetary pinion and internal gear is quite important, for with a stationary internal gear and with the planetary pinion rotated at power shaft speed the planetary pinion would not make a complete rotation on its own axis during the cycle of engine operation and the axis of valve connection would not describe a closed figure during the cycle, if any other ratio of pitch diameters were employed.

A very important advantage of the construction, aside from those above enumerated, lies in the fact that by adjusting the position of the internal gear the entire series of valve functions can be advanced or retarded. The gear can be adjusted in either direction, while the engine is in operation, thus enabling the determination of the correct position of said gear, or the position which results in highest efficiency.

This application is a continuation of my prior application for valve operating mechanism, filed July 11th, 1910, Serial No. 571,472.

Having thus described my invention, what I claim is:

1. In combination with the crank shaft and cylinder of an internal combustion engine, a valve adapted to control both the inlet to and exhaust of gases from the cylinder, a valve rod connected to the valve, and a valve gear comprising a member which has a connection with the valve rod, and means for operating said member so as to impart to the axis of said connection a hypocycloidal path of movement.

2. In combination with the crank shaft and cylinder of an internal combustion engine, a valve adapted to control respectively the admission to and exhaust of gases from the cylinder, a valve gear comprising a member which is connected to the valve, and means for operating said member so as to impart to the axis of said connection a three-lobed hypocycloidal path of movement.

3. In combination with the crank shaft and cylinder of an internal combustion engine, a valve adapted to control both the admission to and exhaust of gases from the cylinder, a valve rod suitably connected to the valve, and a valve gear comprising a member which has a connection with the valve rod, and means for rotating said member about its own axis and revolving said member about another axis so as to impart to the axis of said connection, during a complete cycle of engine operation, a closed substantially triangular path of movement.

4. In combination with the crank shaft and cylinder of an internal combustion engine, a valve adapted to control both the admission to and exhaust of gases from the cylinder, a valve rod connected to the valve, and a valve gear comprising a member which has a connection with the valve rod, and means for operating said member so that the axis of said connection describes during a complete cycle of engine operation a closed substantially triangular figure with loops at the apices of the triangle.

5. In combination with an internal combustion engine, a cylinder, a valve adapted to control both the admission of gases to and the exhaust of gases from the cylinder, a valve operating mechanism comprising an internal gear, a pinion in mesh with the gear and operatively connected with the valve, and means for revolving the pinion about the axis of the gear.

6. In combination in an internal combustion engine, a cylinder, a valve adapted to control both the admission of gases to and the exhaust of gases from the cylinder, and a valve gear having a connection with the valve and adapted to impart to said connection a path of movement comprising a series of hypocycloidal curves, said valve gear comprising an internal gear, a pinion in mesh therewith, and driving means eccentrically supporting said pinion, so as to revolve the same about the axis of said gear.

7. In an internal combustion engine, a cylinder, a valve for controlling the admission and exhaust of gases, and a valve operating means comprising an internal gear, a pinion in mesh therewith, a crank having its axis at the axis of said gear, the pinion supported by said crank so as to be revolved about the axis of the gear and to rotate on its own axis, said pinion having a connection with the valve and imparting to said connection the resultant of its two movements.

8. In combination with a cylinder and valve of an internal combustion engine, a valve operating mechanism comprising hypocycloidal gearing including an internal gear, and a pinion adapted to be rotated about the axis of said gear in mesh with the latter, said pinion having a connection with the valve, the axis of which connection is displaced with reference to the pitch line of the pinion.

9. In combination with the cylinder and valve of an internal combustion engine, a valve operating means comprising an internal gear, a pinion in mesh with the gear, and means for revolving said pinion about the axis of the gear, said pinion having an operative connection with the valve and having a pitch diameter two thirds that of the internal gear.

10. In combination with the crank shaft and cylinder of an internal combustion engine, a valve adapted to control both the admission of gases to and the exhaust of gases from the cylinder, a valve operating means comprising a crank operated at crank shaft speed, a stationary internal gear arranged concentrically with respect to the axis of said crank, a pinion supported by said crank and adapted to be revolved about the axis thereof in mesh with said gear, said pinion having an operative connection with the valve and having a pitch diameter substantially two-thirds that of the internal gear.

In testimony whereof, I hereunto affix my signature in the presence of two witnesses.

DANIEL APPEL.

Witnesses:
A. F. KWIS,
A. J. HUDSON.